(12) United States Patent
Kishimoto

(10) Patent No.: US 10,375,178 B2
(45) Date of Patent: Aug. 6, 2019

(54) INFORMATION PROCESSING APPARATUS THAT TRANSMITS A PACKET A PREDETERMINED PERIOD OF TIME AFTER DETECTING LINK-UP, METHOD OF CONTROLLING THE SAME, AND STORAGE MEDIUM

(71) Applicant: CANON KABUSHIKI KAISHA, Tokyo (JP)

(72) Inventor: Norihisa Kishimoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/785,643

(22) Filed: Oct. 17, 2017

(65) Prior Publication Data

US 2018/0041592 A1 Feb. 8, 2018

Related U.S. Application Data

(63) Continuation of application No. 15/045,880, filed on Feb. 17, 2016, now Pat. No. 9,826,047.

(30) Foreign Application Priority Data

Feb. 25, 2015 (JP) .................................. 2015-035629

(51) Int. Cl.
*G06F 3/12* (2006.01)
*H04L 29/08* (2006.01)
*H04L 29/06* (2006.01)

(52) U.S. Cl.
CPC ............ *H04L 67/16* (2013.01); *G06F 3/1218* (2013.01); *H04L 67/42* (2013.01)

(58) Field of Classification Search
CPC ...... H04N 67/26; H04N 67/42; G06F 3/1236; G06F 3/1218
USPC .................................................. 358/1.1–1.18
See application file for complete search history.

(56) References Cited

U.S. PATENT DOCUMENTS

| | | | |
|---|---|---|---|
| 9,826,047 B2 * | 11/2017 | Kishimoto | .............. H03L 67/16 |
| 2006/0039373 A1 | 2/2006 | Nakamura et al. | |
| 2006/0209874 A1 | 9/2006 | Nagata | |
| 2007/0041530 A1 | 2/2007 | Tanimoto et al. | |
| 2009/0307371 A1 * | 12/2009 | Okazaki | ............ H04L 29/12028 709/233 |
| 2012/0178835 A1 * | 7/2012 | Findlay | ................ B01D 67/002 521/27 |
| 2016/0246553 A1 * | 8/2016 | Kishimoto | .............. H04L 67/16 |

FOREIGN PATENT DOCUMENTS

| | | |
|---|---|---|
| JP | 08-181704 A | 7/1996 |
| JP | 2014203104 A | 10/2014 |
| JP | 2016019024 A | 2/2016 |

* cited by examiner

*Primary Examiner* — Gabriel I Garcia
(74) *Attorney, Agent, or Firm* — Venable LLP

(57) ABSTRACT

The present information processing apparatus sets a transmission standby time in accordance with a user instruction, detects a link-up, transmits an SLP packet, times an elapsed time from detection of the link-up, and in accordance with the elapsed time reaching the transmission standby time, controls so as to transmit an SLP packet.

11 Claims, 14 Drawing Sheets

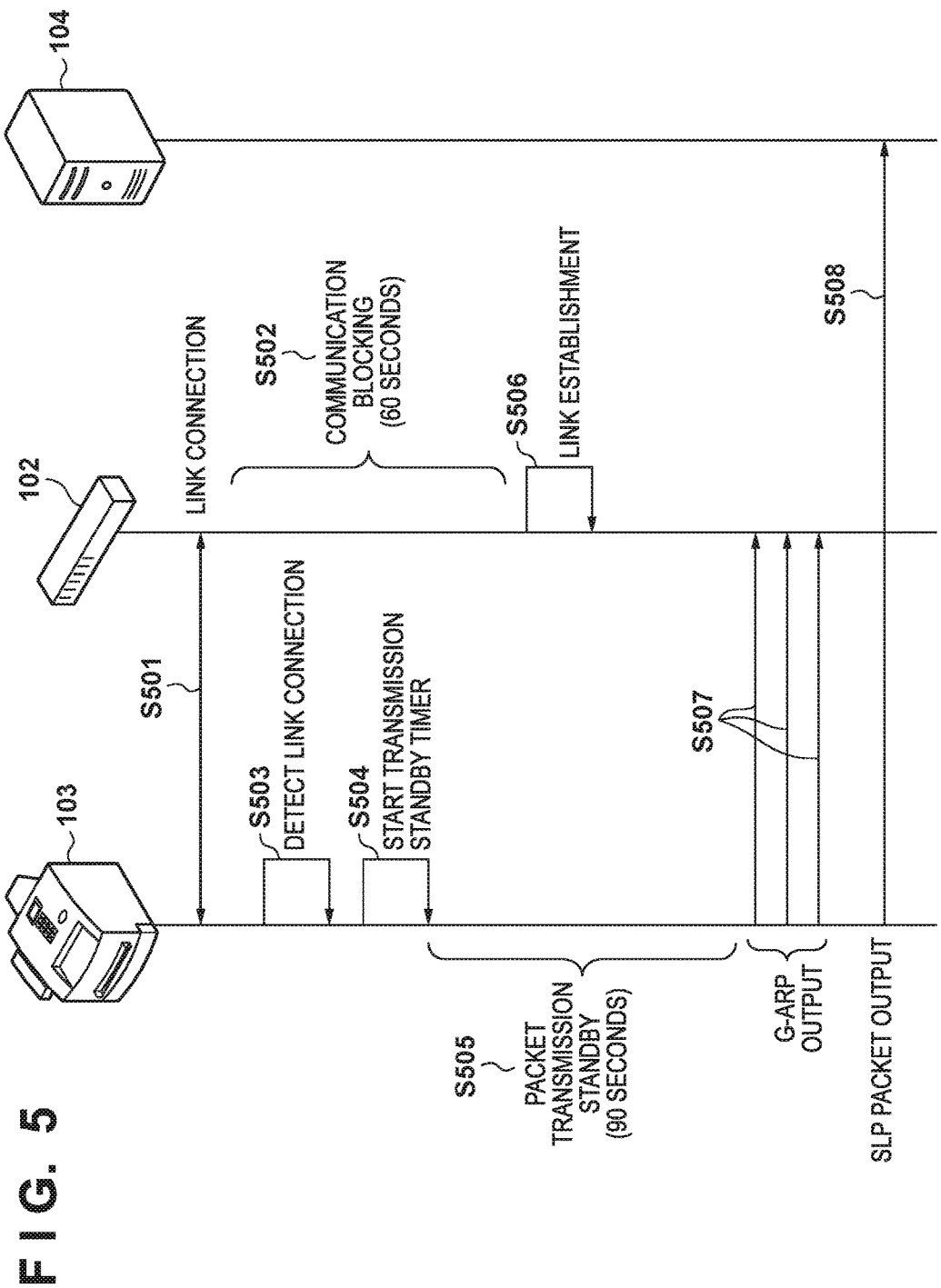

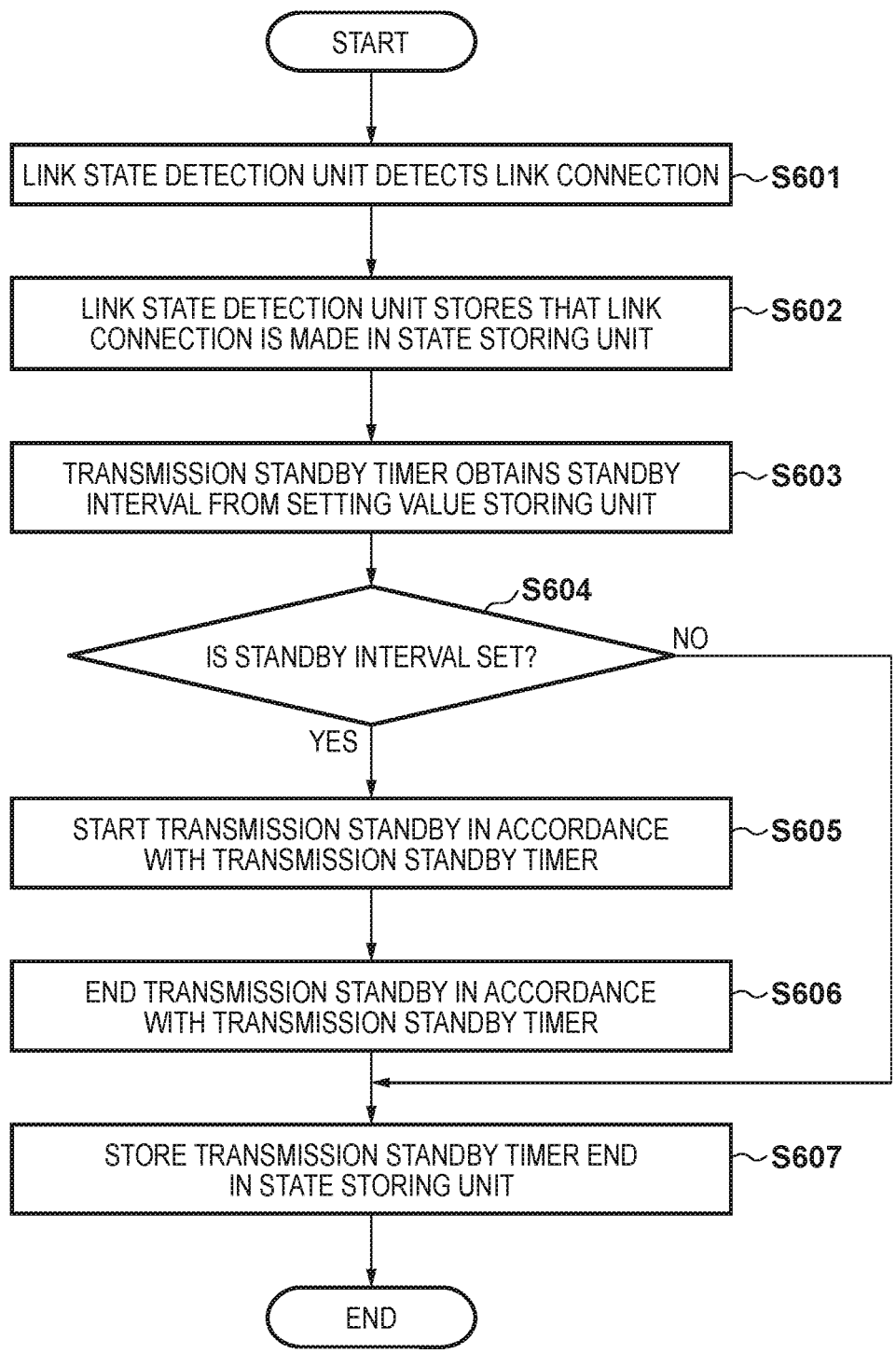

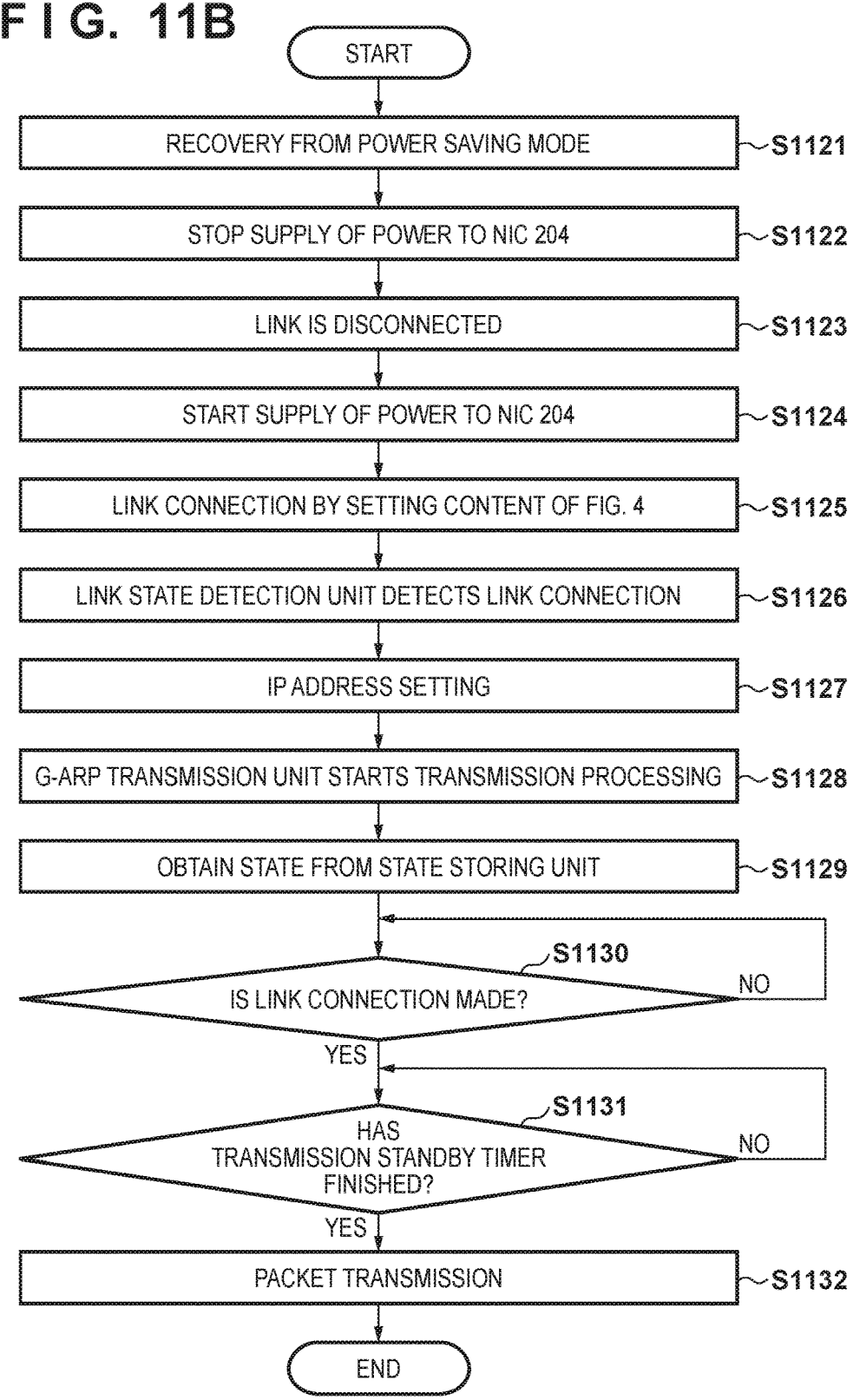

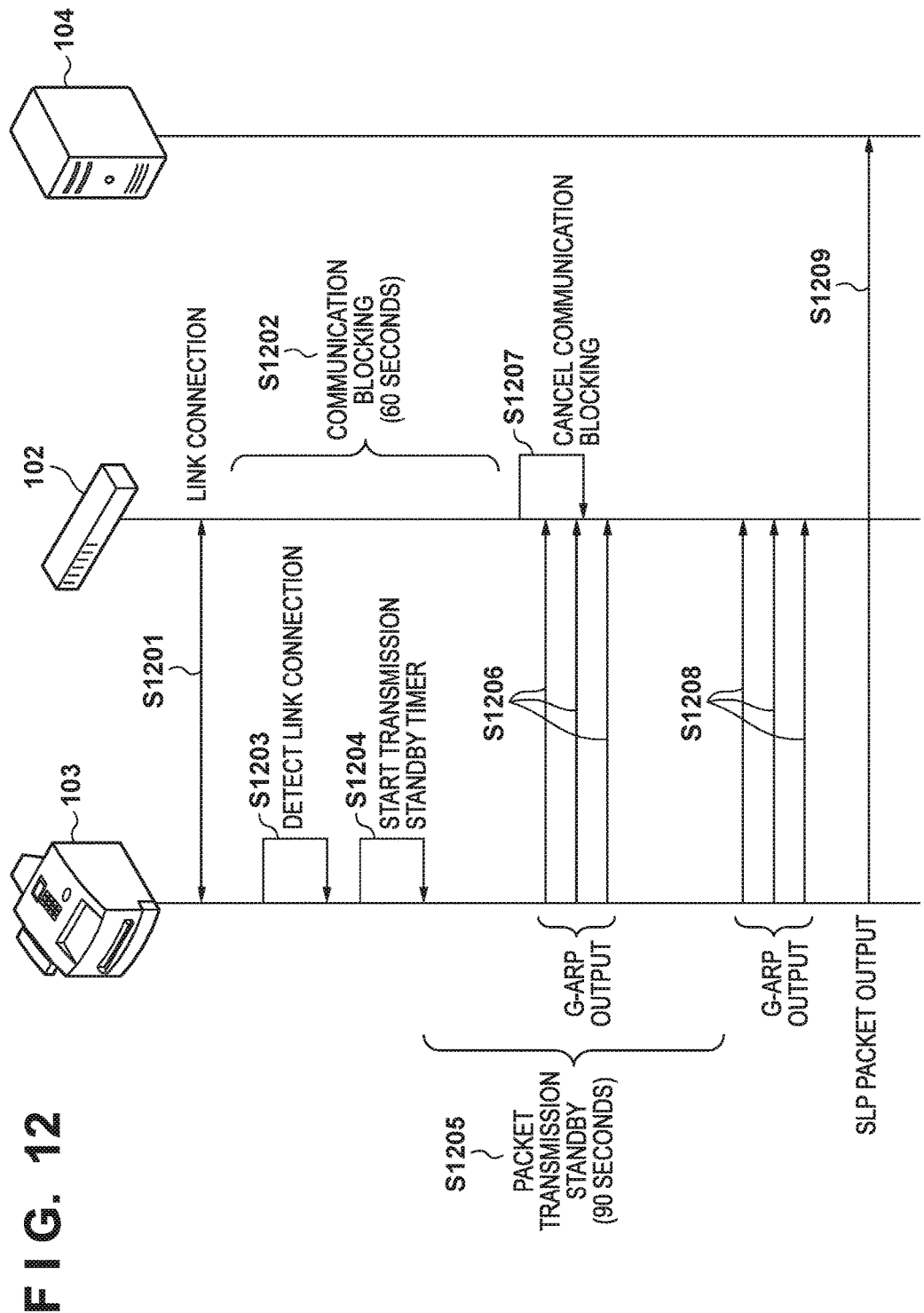

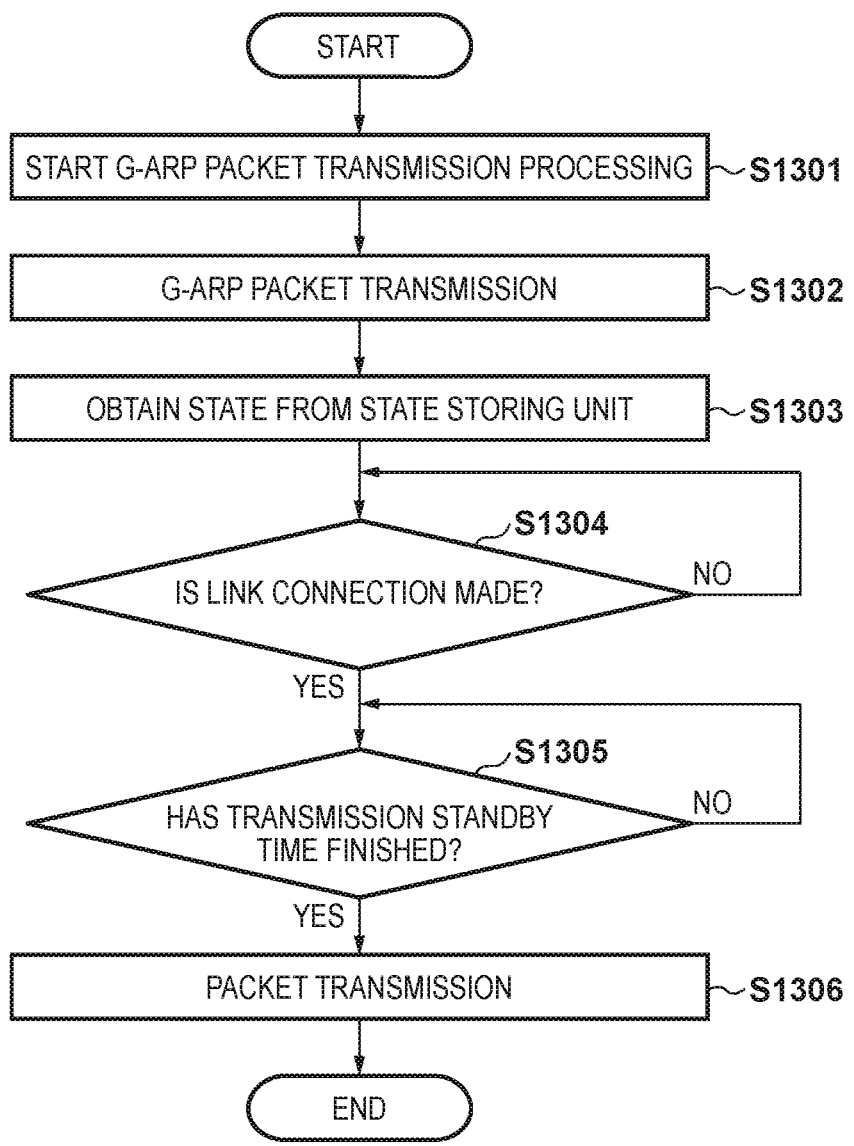

INFORMATION PROCESSING APPARATUS THAT TRANSMITS A PACKET A PREDETERMINED PERIOD OF TIME AFTER DETECTING LINK-UP, METHOD OF CONTROLLING THE SAME, AND STORAGE MEDIUM

CROSS-REFERENCE TO RELATED APPLICATION

This application is a continuation of U.S. patent application Ser. No. 15/045,880, filed Feb. 17, 2016, which is herein incorporated by reference

BACKGROUND OF THE INVENTION

Field of the Invention

The present invention relates to an information processing apparatus, a method of controlling the same, and a storage medium.

Description of the Related Art

Japanese Patent Laid-Open No. H08-181704 proposes a technique in which, in a device that connects to a network, a packet is simultaneously transmitted upon connecting. In such a device, for example, upon activation or when a network cable is inserted or extracted, communication confirmation with a HUB, router, or the like to which the device is connected, duplication detection for IP addresses or the like that the device itself is to use, a state notification to a server that manages the device itself, or the like are performed.

However, there is a problem with the above described conventional technique as recited below. For example, in the above described prior art, by transmitting a packet simultaneously upon connecting to a network, it is possible to automatically notify an external apparatus of information of the device without being cumbersome to a user. However, when the device is connected into a hub, because firstly control such as determining a link rate between the device and the hub is performed, there exists something that requires time before it is possible to process network communication packets. In addition, when such a hub is connected to an environment referred to as a spanning tree, it is known that time until packet communication can be performed becomes still longer. Furthermore, because this depends on a characteristic of the hub, a time over which communication is blocked differs for each hub (there are those for which it takes time in units of several tens of seconds). In addition, because an error or the like is not returned with respect to communication, it is not possible for a device connected to the hub to notice that communication cannot be performed.

Accordingly, if a packet to be transmitted simultaneously with network connection is immediately transmitted when a device is connected to such a hub, there exists a problem of not only not reaching a desired destination, but that it is not even possible to know that the packet has not reached the destination. Such a phenomenon, for example could occur when the device is activated, when a cable is extracted or inserted, when a power saving state is transitioned into, when the power saving state is returned from, or the like.

SUMMARY OF THE INVENTION

The present invention enables realization of an arrangement in which, even in a case where a connection destination apparatus blocks communication at a time of an initial connection of a network, a packet initially transmitted is suitably caused to reach the apparatus.

One aspect of the present invention provides an information processing apparatus that transmits an SLP packet, the apparatus comprising: a setting unit configured to set a transmission standby time in accordance with a user instruction; a detection unit configured to detect a link-up; a transmission unit configured to transmit an SLP packet; a timer unit configured to time an elapsed time from the detection of the link-up by the detection unit; and a control unit configured to control, in accordance with the elapsed time reaching the transmission standby time, the transmission unit so as to transmit an SLP packet, wherein during a time until the elapsed time reaches the transmission standby time, the transmission unit does not transmit an SLP packet.

Another aspect of the present invention provides a method of controlling an information processing apparatus including a transmission unit that transmits an SLP packet, the method comprising: setting a transmission standby time in accordance with a user instruction; detecting a link-up; timing an elapsed time from the detection of the link-up; and controlling, in accordance with the elapsed time reaching the transmission standby time, the transmission unit so as to transmit an SLP packet, wherein during a time until the elapsed time reaches the transmission standby time, the SLP packet is not transmitted.

Still another aspect of the present invention provides a non-transitory computer-readable storage medium storing a computer program for causing computer to execute a method of controlling an information processing apparatus including a transmission unit that transmits an SLP packet, the method comprising: setting a transmission standby time in accordance with a user instruction; detecting a link-up; timing an elapsed time from the detection of the link-up; and controlling, in accordance with the elapsed time reaching the transmission standby time, the transmission unit so as to transmit an SLP packet, wherein during a time until the elapsed time reaches the transmission standby time, the SLP packet is not transmitted.

Further features of the present invention will be apparent from the following description of exemplary embodiments with reference to the attached drawings.

BRIEF DESCRIPTION OF THE DRAWINGS

FIG. 5 is a sequence diagram for illustrating packet output processing according to an embodiment.

FIG. 6A is a flowchart of the image forming apparatus according to an embodiment.

FIG. 11B is a flowchart of the image forming apparatus according to an embodiment.

FIG. 12 is a sequence diagram for illustrating packet output processing according to an embodiment.

FIG. 13 is a flowchart of the image forming apparatus according to an embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<System Configuration>

Figure 1:
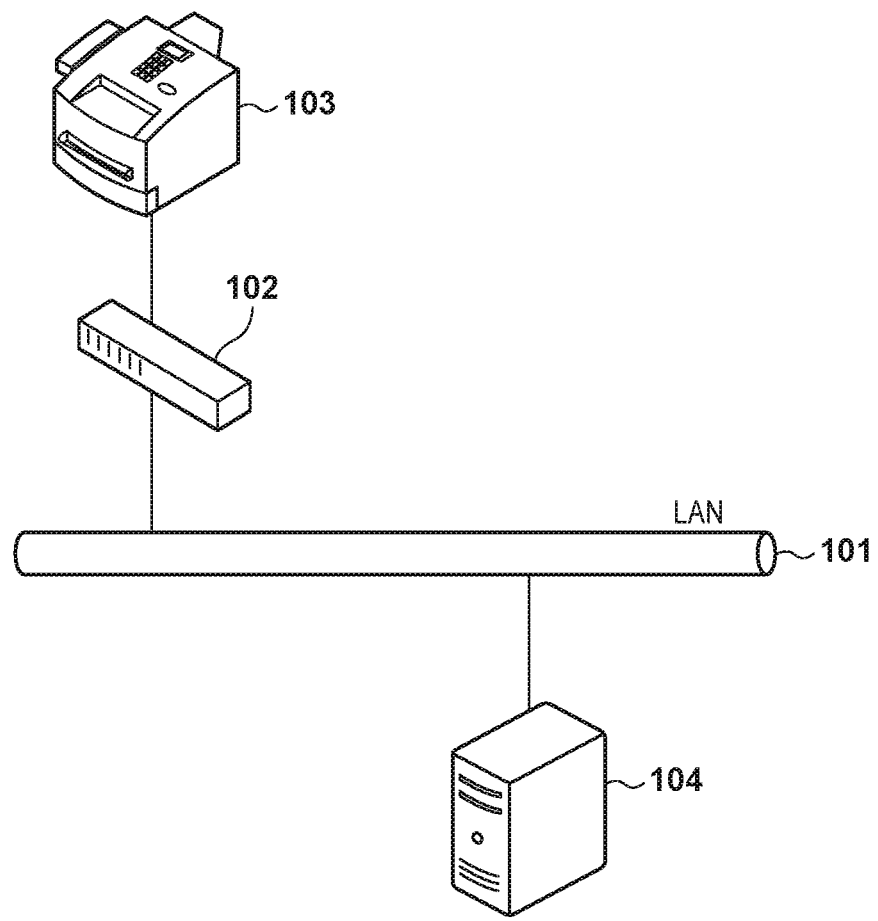
FIG. 1 is a view for illustrating a network configuration according to an embodiment.

Below, explanation will be given for a first embodiment of the present invention. Firstly, explanation is given for an assumed network system configuration, with reference to FIG. 1. The network system includes a switching hub (hereinafter, referred to as a switch) 102, an image forming apparatus 103, and a terminal apparatus 104, connected via a LAN 101. The image forming apparatus 103 is one example of a device (information processing apparatus) which uses a network connection.

The image forming apparatus 103 is a device comprising one or more functions such as a printer or a scanner, and is connected to the LAN 101 through a switch 102, which is located in layer 2 in an OSI reference model. The network to which the switch 102 is connected, is assumed here to be the LAN (Local Area Network) 101 but may be a WAN (Wide Area Network). Also, it is assumed that the switch 102 is a layer 2 switch but a switch of another layer may be used. The terminal apparatus 104 connected to the LAN 101 is a terminal performing communication with an application installed in the image forming apparatus 103, and is assumed here to be a PC.

Here, terms used hereinafter are defined. Connecting a network communication device such as the image forming apparatus 103 or the terminal apparatus 104 to the switch 102 physically using a cable is referred to as "a link connection (link-up)". This state is a state in which a device is merely connected to the switch 102, and is not a state in which communication is possible. Also, entering a state in which a link rate is determined on the side of the switch 102 and transferring a packet is stably performed is referred to as "link establishment". Even if a packet is sent before link establishment, the switch cannot transfer the packet. Furthermore, an IP address being set on the side of a network communication device such as the image forming apparatus 103 and all applications entering a state in which communication is possible is referred to as a "network connection".

<Configuration of Image Forming Apparatus>

Figure 2:
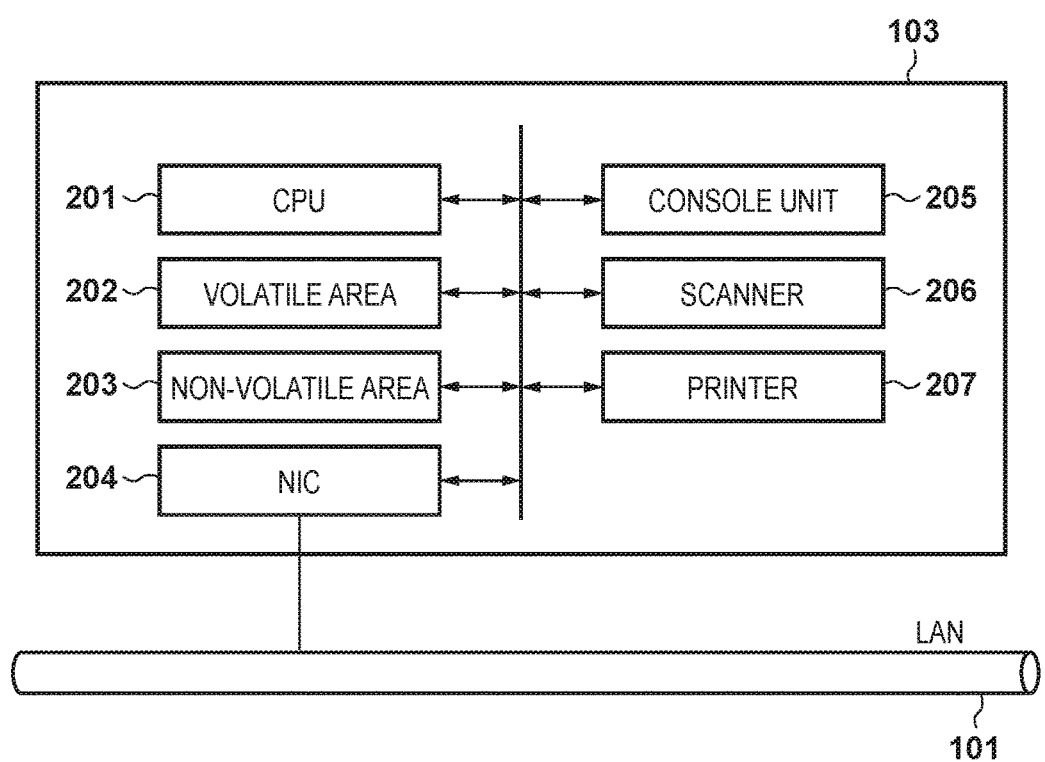
FIG. 2 is a hardware configuration diagram of the image forming apparatus according to an embodiment.

Next, a configuration of the image forming apparatus 103 according to the present embodiment is described with reference to FIG. 2 through FIG. 4. FIG. 2 indicates one example of a hardware configuration of the image forming apparatus 103. The image forming apparatus 103 comprises a CPU 201, a volatile area 202, a non-volatile area 203, an NIC 204, a console unit 205, a scanner 206, and a printer 207.

The CPU 201 executes a software program of the image forming apparatus 103, and performs control of the entire apparatus comprehensively. The volatile area 202 is a random access memory and is used for temporary data storage, or the like, when the CPU 201 controls the apparatus. The non-volatile area 203 is a non-volatile memory such as a hard disk drive or an NVRAM, and is for storing various settings values or the like of the image forming apparatus 103. The console unit 205 comprises a liquid crystal panel, causes various operation screens to be displayed, and also transfers an instruction from a user input through an operation screen to the CPU 201. The NIC 204 handles the role of a network interface, and connects the image forming apparatus 103 to the network. The scanner 206 reads an image on an original and generates image data. The printer 207 prints an image based on image data onto a recording medium.

Figure 3:
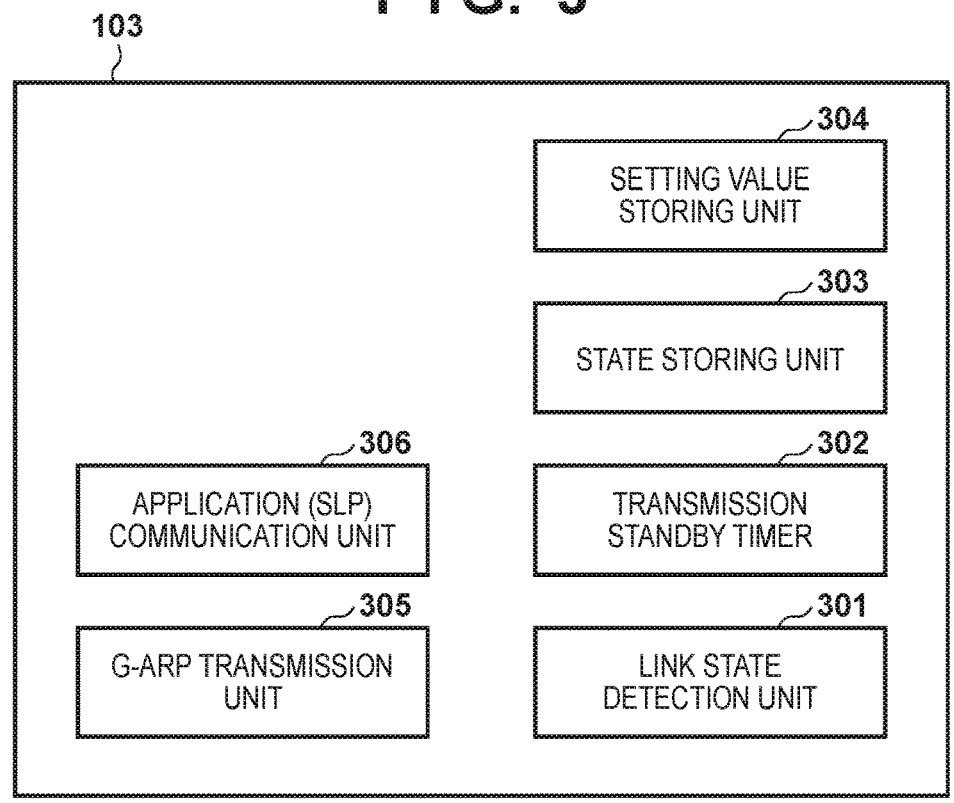
FIG. 3 is a software configuration diagram of the image forming apparatus according to an embodiment.
Figure 4:
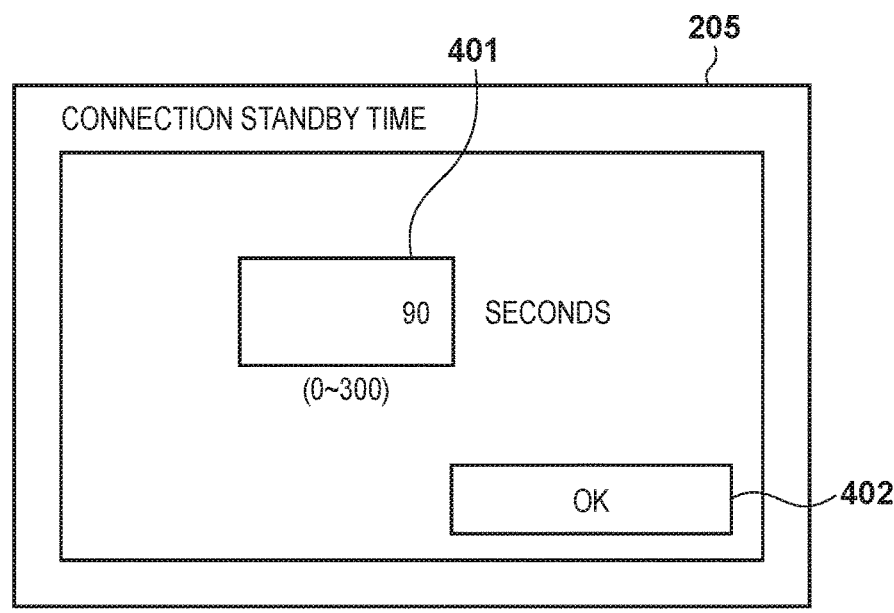
FIG. 4 is a view for illustrating a user interface of the image forming apparatus according to an embodiment.

FIG. 3 indicates one example of a software configuration of the image forming apparatus 103. Here, only portions relating to the present invention are described. Accordingly, the present invention is not limited to the configuration illustrated in FIG. 3, and configuration may be taken to include other components. The image forming apparatus 103 comprises, as a software configuration, a link state detection unit 301, a transmission standby timer 302, a state storing unit 303, a setting value storing unit 304, a G-ARP transmission unit 305, and an application (SLP) communication unit 306.

The setting value storing unit 304 is a unit for holding an item set by the user through the console unit 205. The state storing unit 303 holds a link connection state of the NIC 204 (a state indicating whether or not the NIC 204 and the switch 102 have a link connection) or a state indicating whether or not preparation for the image forming apparatus 103 to send a packet on the network has been performed.

The G-ARP transmission unit 305 sends a G-ARP (Gratuitous ARP) packet to the LAN 101 through the NIC 204. G-ARP is a packet used for a duplication detection for an IP address used by the sending device, or for joining a network, and is sent after a link establishment, i.e., after packet transmission becomes possible. In other words, the G-ARP packet is a packet required for establishing communication.

The application communication unit 306 is an application that performs communication with the terminal apparatus 104, and here is an application that transmits an SLP (Service Location Protocol) packet to the terminal apparatus 104. A communication packet of such an application is transmitted after a completion of the network connection, i.e., after it reaches a communicable state. In other words, the SLP packet is a packet that should be transmitted after establishing communication. Note that there may be a plurality of such applications.

Also, although G-ARP and SLP are described as representative examples as a protocol for which communication occurs after the link establishment, and as a protocol for which communication occurs after the network connection respectively, the present invention is not limited to these and can be applied to other packets. Also, the number of packets to send may be one for a single transmission timing, or may be plural.

Here, when the G-ARP packet or the SLP packet are to be sent, there is no point in sending them when the state is not such that the NIC 204 and the switch 102 have the link connection and also the link establishment. Therefore, the NIC 204 is monitored using the link state detection unit 301, it is detected whether or not the NIC 204 and the switch 102 have the link connection, and the result is saved in the state storing unit 303. Accordingly, the G-ARP transmission unit 305 or the application communication unit 306, before transmitting a packet, check the state of the state storing unit 303 and determine whether or not transmission is possible, and then perform transmission.

In addition, below, it is assumed that the switch 102 blocks communication for a fixed interval from the link connection to the link establishment. In other words, when the NIC 204 makes the link connection with the switch 102, from that point the switch 102 discards packets transmitted from the NIC 204 and does not transfer them to the LAN 101 until a particular interval elapses. Also, a packet to the NIC 204 is not transferred to the image forming apparatus 103 either. Here, it is assumed that the switch 102 blocks communication for 60 seconds. In reality there are cases in which a shorter interval is present, and cases in which communication is not possible for a longer interval.

In order support such a switch, the image forming apparatus 103 according to the present embodiment has a function for suppressing a packet output for a fixed interval after a link connection is performed. In addition, in the image forming apparatus 103, it is possible to set the interval for suppressing output of a packet through the user interface in FIG. 4 displayed on the console unit 205. A setting area 401 is an area in which a user inputs a connection standby time. Here, a connection standby time of 0-300 seconds can be set. In FIG. 4, setting is performed to suppress packet output for 90 seconds from the link connection. By the user inputting a desired connection standby time in the setting area 401 and operating an OK button 402, the setting value is stored in the setting value storing unit 304. Here, the switch 102 actually blocks packets for 60 seconds, and the user has set 90 seconds to wait for transmission in order to have a margin, but a value such as 60 seconds may be set to match behavior of the switch 102.

The explanation of FIG. 3 is returned to. The transmission standby timer 302 obtains the connection standby time set in the setting value storing unit 304 after the image forming apparatus 103 is activated, and also monitors the state storing unit 303, and waits for a link connection state to be achieved. When entry into the link connection state is detected, the transmission standby timer 302 starts a timer with the obtained connection standby time, and keeps time until the set connection standby time elapses. The transmission standby timer 302 stores a start and an end of the timer in the state storing unit 303. The G-ARP transmission unit 305 or the application communication unit 306 refer to the state storing unit 303 before transmitting a packet, confirm that the link connection has been established and that the transmission standby timer 302 has finished keeping time, before actually transmitting a packet. With this, it is possible for packet transmission to standby until the switch 102 can process a packet.

<Sequence>

Next, with reference to FIG. 5 explanation will be given for a flow of a sequence of processing from a link connection to a packet transmission. Firstly, in step S501, the image forming apparatus 103, upon activation, starts a link connection to the switch 102. In step S502, the switch 102 performs processing, such as determining a link rate, in order to perform communication with the image forming apparatus 103. During this, a packet transmitted from the image forming apparatus 103 is blocked. Meanwhile, the image forming apparatus 103, in step S503, detects a link connection by the link state detection unit 301, in step S504 starts the transmission standby timer for waiting for packet transmission for a time period stored in the setting value storing unit 304, and in step S505 waits to transmit a packet.

In step S506, the switch 102 releases the block on communication after 60 seconds have elapsed from the link connection. Meanwhile, in step S507, the image forming apparatus 103 also releases suppression of packet transmission after the 90 seconds from starting the timer in step S504, and firstly transmits a G-ARP packet to the switch 102 by the G-ARP transmission unit 305. Next, in step S508, the application communication unit 306 transmits the SLP packet to the terminal apparatus 104. FIG. 5 illustrates that a G-ARP packet is transmitted three times but actually any number of packets may be transmitted.

<Processing Procedure>

Next, a detailed processing procedure of mainly the transmission standby timer 302 in the image forming apparatus 103 is described with reference to FIG. 6A. Processing explained below is realized by the CPU 201 reading out a control program stored in advance in the non-volatile area 203 to the volatile area 202 and executing it.

In step S601, when a link connection between the NIC 204 and the switch 102 is made, the link state detection unit 301 detects that a link is connected, and in step S602 the link state detection unit 301 stores such information in the state storing unit 303. Then, the transmission standby timer 302 obtains an interval for suppressing packet transmission from the setting value storing unit 304 in step S603. Next, the transmission standby timer 302 determines whether or not the interval for suppressing transmission is zero in step S604; in a case of zero the processing proceeds to step S607, where either a state in which the transmission standby timer has expired or that transmission standby is not performed is stored in the state storing unit 303. Meanwhile, in a case where the interval for suppressing transmission is not zero, the processing proceeds to step S605, the CPU 201 starts the timer of the transmission standby timer 302, and in step S606 confirms that the transmission standby timer 302 has completed. Then, in step S607 the CPU 201 saves that the state is that the timer has expired in the state storing unit 303, and processing terminates.

Figure 6B:
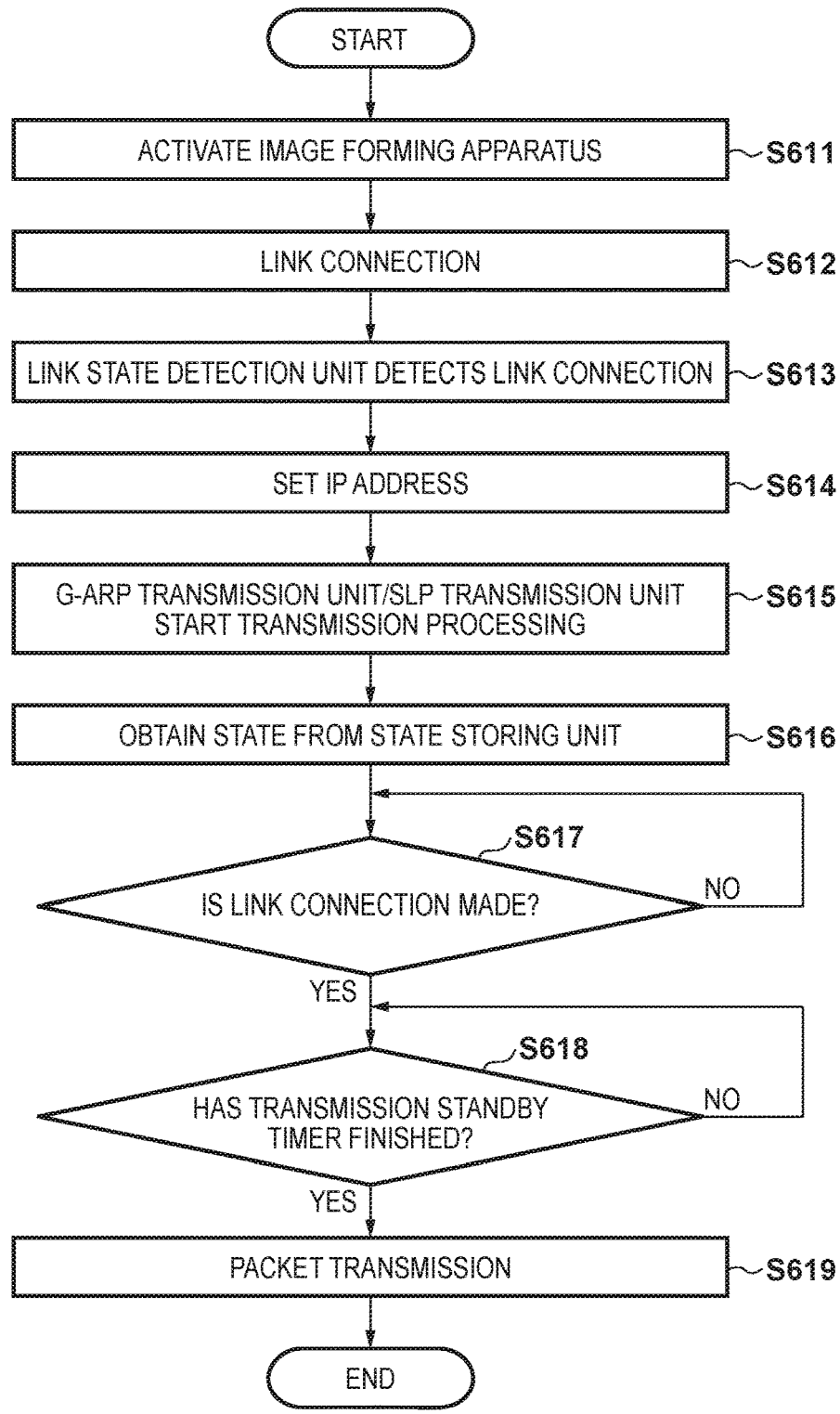
FIG. 6B is a flowchart of the image forming apparatus according to an embodiment.

Next, a detailed processing procedure of the G-ARP transmission unit 305 and the application communication unit 306 in the image forming apparatus 103 is described with reference to FIG. 6B. Note that, explanation is given here of a process when the image forming apparatus 103 is activated and joins a network. Also, because it is the same for G-ARP transmission processing and SLP transmission processing, they described collectively in FIG. 6B. Processing explained below is realized by the CPU 201 reading out a control program stored in advance in the non-volatile area 203 to the volatile area 202 and executing it.

In step S611, the image forming apparatus 103 is activated. Next, in step S612, the CPU 201 starts a link connection. In step S613, the link state detection unit 301 detects the link connection. In step S614, the CPU 201 performs setting of an IP address or the like. Here, it is expected that the setting is performed by a method other than an automatic setting such as DHCP, but the setting may be performed by a method such as DHCP. When the setting of an IP address is completed, in step S615 the G-ARP transmission unit 305 and the application communication unit 306 start packet transmission processing.

At that time, in step S616 the G-ARP transmission unit 305 and the application communication unit 306 obtain a link connection state and a timer state from the state storing unit 303. Next, in step S617 the G-ARP transmission unit 305 and the application communication unit 306 investigate whether or not a link connection is made, and wait until a link is connected. When a link is connected, the processing proceeds to step S618, and the G-ARP transmission unit 305 and the application communication unit 306 determine whether or not the timer of the transmission standby timer 302 has expired. When the timer has expired, the processing proceeds to step S619, the G-ARP transmission unit 305 and the application communication unit 306 respectively transmit a packet, and the processing terminates.

As explained above, the image forming apparatus 103 according to the present embodiment, at a time of activation or the like, restricts packet transmission when it connects to a network, considering an initial packet blocking interval of a connection destination apparatus (for example, a hub such as the switch 102). Specifically, the image forming apparatus 103 suppresses packet transmission for an interval from when a link to the apparatus is connected, i.e. from when a physical connection is confirmed, until the interval set in advance elapses. With this, even in a case where a packet blocking interval is arranged by the connection destination apparatus upon the initial connection, it is possible to transmit a packet which is transmitted/received initially to the partner side reliably.

<Second Embodiment>

Below, explanation will be given for a second embodiment of the present invention. In the present embodiment, explanation will be given not for a time of the activation of the image forming apparatus 103 explained in the above described first embodiment, but for a case where a change of setting relating to Ethernet (registered trademark) is performed by a user or for a case where extraction/insertion of a network cable is performed. For both cases, the same processing flow is performed, so explanation is given only for a case where a change of setting relating to Ethernet is performed. Also, the network configuration, configuration of the image forming apparatus, a flow from a link connection to a packet transmission, and the like are the same as in the above described first embodiment, so overlapping explanation is omitted.

Also, processing similar to the flowchart in FIG. 6A explained in the above described the first embodiment is executed for the transmission standby timer 302. However, a trigger by which the processing is started is different. That is, in the present embodiment, after a user changes a setting relating to Ethernet and first cuts a connection to reflect this, when the NIC 204 makes the link connection to the switch 102 again, in step S601 the link state detection unit 301 detects the link connection. Subsequent processing is the same as in the above described first embodiment, so explanation thereof is omitted.

<User Interface>

Figure 7:
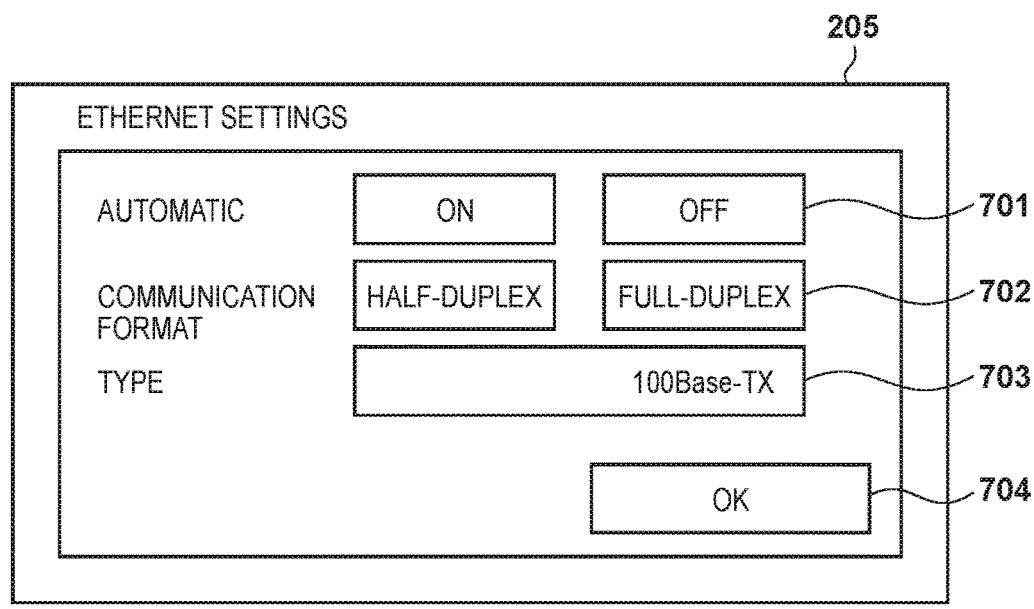
FIG. 7 is a view for illustrating a user interface that performs an NIC setting according to an embodiment.

With reference to FIG. 7, a user interface by which a user changes a setting relating to Ethernet is described. The user interface is displayed on the console unit 205.

A setting 701 indicating whether or not a connection format or type is discriminated automatically with the switch 102, a connection format 702 indicating half-duplex or full-duplex, and a type 703 indicating a communication rate such as 100BASE-TX can be set in this screen which is a user interface. After each setting is performed and an OK button 704 is operated, the settings are stored in the non-volatile area 203.

<Processing Procedure>

Figure 8:
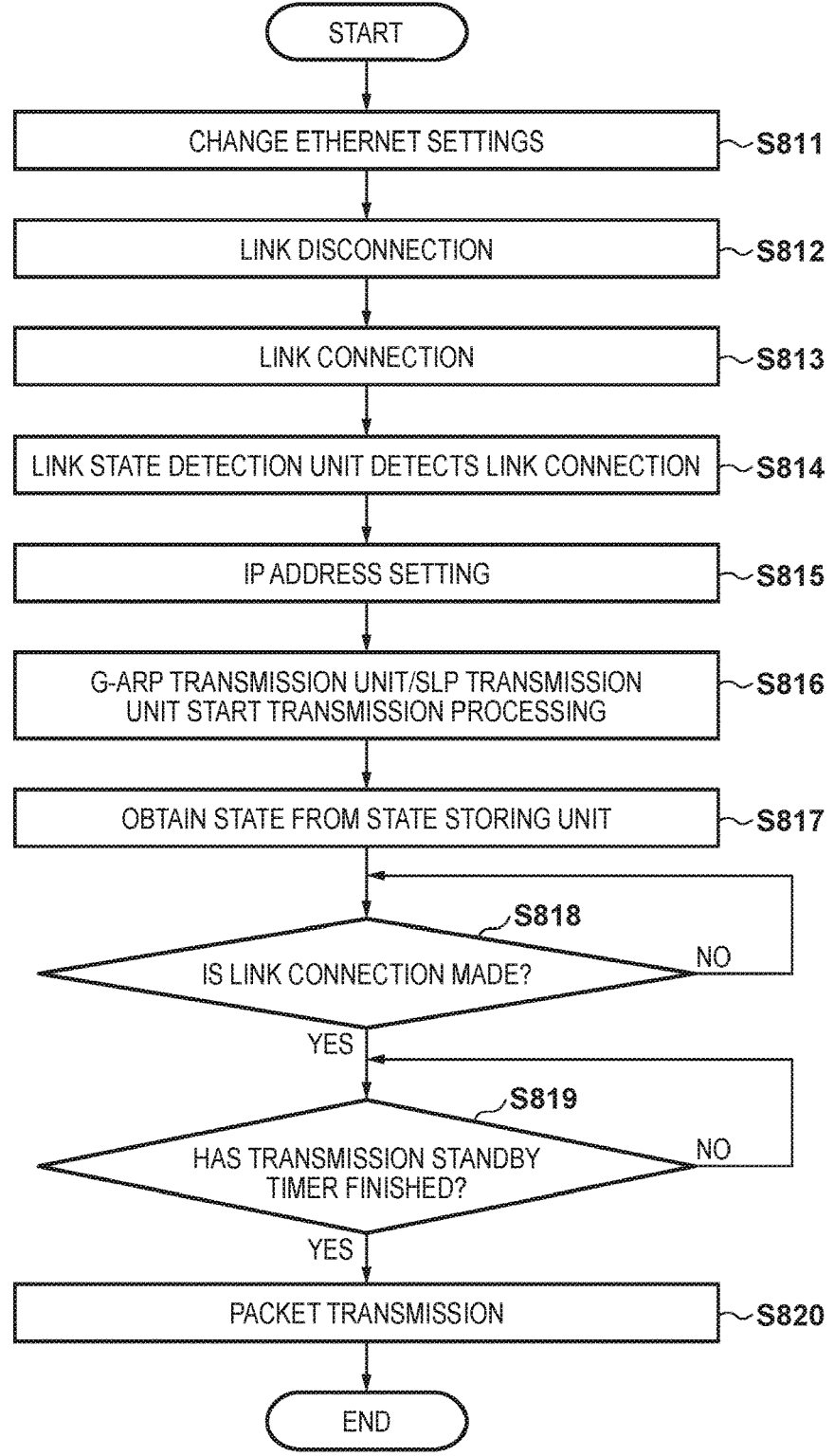
FIG. 8 is a flowchart of the image forming apparatus according to an embodiment.

Next, with reference to FIG. 8, a processing procedure of a case where a setting value is changed through the user interface illustrated in FIG. 7 is described. Processing explained below is realized by the CPU 201 reading out a control program stored in advance in the non-volatile area 203 to the volatile area 202 and executing it.

In step S811, the CPU 201 detects that the setting relating to Ethernet has been changed by the user through the user interface illustrated in FIG. 7, and the change is stored in the non-volatile area 203. In step S812, the CPU 201 disconnects the link established previously by first cutting a power source to the NIC 204 in order to join the network with the new setting. Then, in step S813, the CPU 201 inputs the power source to the NIC 204 again and performs the link connection.

In step S814, the link state detection unit 301 detects the link connection. When the link connection is detected, in step S815, the CPU 201 first performs setting of an IP address or the like. Here, it is expected that the setting is performed by a method other than an automatic setting such as DHCP, but the setting may be performed by a method such as DHCP. When the setting of the IP address is completed, in step S816 the G-ARP transmission unit 305 and the application communication unit 306 start packet transmission processing. At that time, in step S817 the G-ARP transmission unit 305 and the application communication unit 306 obtain a link connection state and a timer state from the state storing unit 303, and first, in step S818, determine whether or not a link connection is made. When a link connection is made, in step S819, the G-ARP transmission unit 305 and the application communication unit 306 determine whether or not the timer of the transmission standby timer 302 has expired. When the timer has expired, the processing proceeds to step S820, the G-ARP transmission unit 305 and the application communication unit 306 transmit a packet, and the processing terminates.

As explained above, the image forming apparatus 103 according to the present embodiment is capable of achieving the same effect as the above described first embodiment even in a case where a change of setting relating to Ethernet is performed by a user, or in a case where removal/insertion of the network cable is performed.

<Third Embodiment>

Next, explanation will be given for a third embodiment of the present invention. A link connection in a case separate to those of the above described first and second embodiments is explained. It is assumed that the image forming apparatus 103 according to the present embodiment comprises a power saving mode for reducing an electric power consumption amount, which is different from a normal activation mode, as an operation mode.

<Configuration of Image Forming Apparatus>

Figure 9:
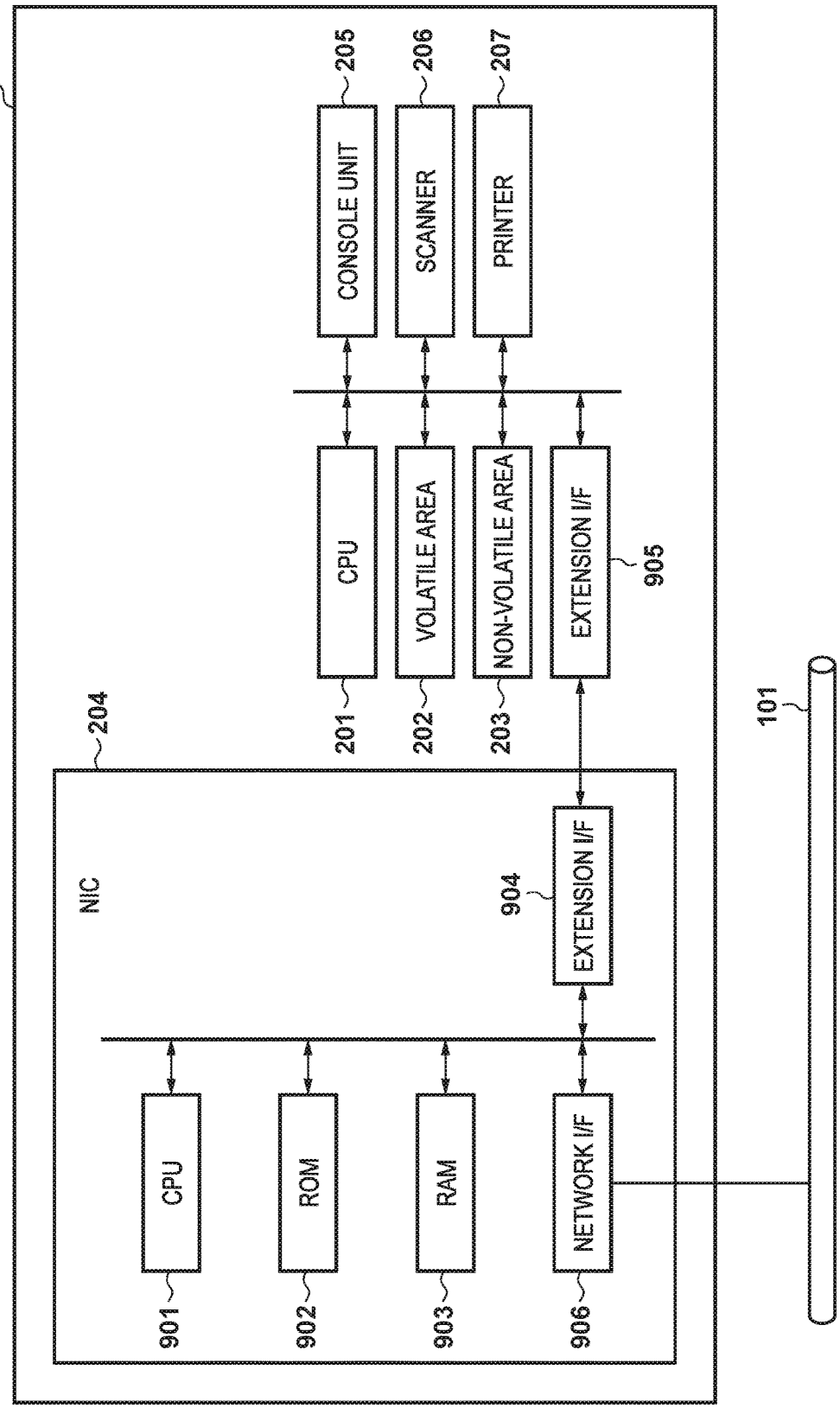
FIG. 9 is a hardware configuration diagram of the image forming apparatus according to an embodiment.

Firstly, an example of a hardware configuration of an image forming apparatus is explained with reference to FIG. 9. In the present embodiment, as illustrated by a hardware configuration in FIG. 9, the NIC 204 comprises a CPU 901, different from the CPU 201. Furthermore, the NIC 204 comprises a ROM 902, which stores programs, fixed parameters, or the like, of the NIC 204, and a RAM 903, which is used for storing temporary data when the CPU 901 controls the NIC 204. Also, it is assumed that it is connected to an extension I/F 905 on the CPU 201 side through an extension I/F 904.

When the image forming apparatus 103 transitions to the power saving mode, a power supply to the CPU 201 or the non-volatile area 203 is stopped. On the other hand, supply of a power source to the NIC 204 is continued, so it is possible for the CPU 901 in its place to perform a connection or a communication to the network of the NIC 204. Also, a function called Wake On Lan (WoL), which resumes supply of the power source to the CPU 201 or the non-volatile area 203 in a case where a predetermined packet (for example, a packet of job request to the image forming apparatus 103) is received by the CPU 901, is installed. Furthermore, in order to reduce power in the power saving mode to the utmost, a function that changes communication after transitioning to the power saving mode to 10BASE-T is also installed. When changing to 10BASE-T, it is necessary to restart the CPU 901, so an established link is first disconnected and then the link connection is performed once again. In the present embodiment, the transmission of G-ARP is performed by the NIC 204. Meanwhile, the transmission of SLP is performed by the CPU 201 side, as in the above described first and second embodiments. Therefore, below is limited to only describing control of G-ARP.

Figure 10A:
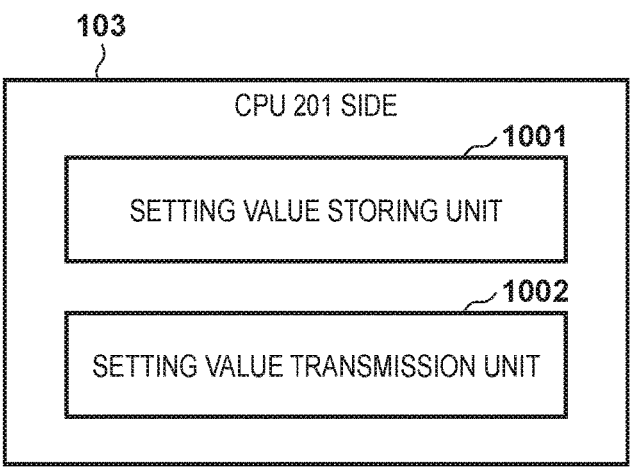
FIG. 10A is a software configuration diagram of the image forming apparatus according to an embodiment.

Next, an example configuration of software controlled by the CPU 201 is described with reference to FIG. 10A. A setting value storing unit 1001 is the same as reference numeral 301 described in FIG. 3, and holds the value set in FIG. 4. A setting value transmission unit 1002 has a role of transmitting the value stored in the setting value storing unit 1001 to the NIC 204.

Figure 10B:
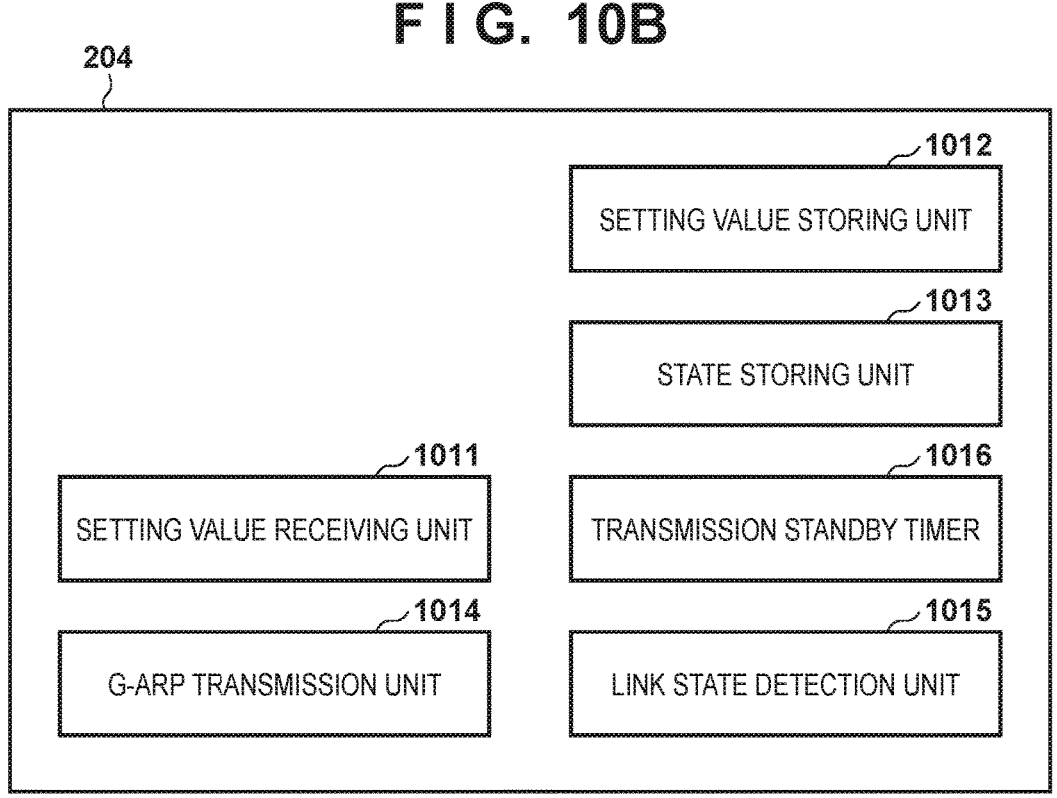
FIG. 10B is a software configuration diagram of the image forming apparatus according to an embodiment.

Next, an example configuration of software controlled by the CPU 901 of the NIC 204 is described with reference to FIG. 10B. The NIC 204 comprises, as software configurations, a setting value receiving unit 1011, a setting value storing unit 1012, a state storing unit 1013, a G-ARP transmission unit 1014, a link state detection unit 1015, and a transmission standby timer 1016.

The setting value receiving unit 1011 comprises a function for receiving the previously described setting value transmitted from the setting value transmission unit 1002, and the received setting value is stored in the setting value storing unit 1012. The state storing unit 1013, the G-ARP transmission unit 1014, the link state detection unit 1015, and the transmission standby timer 1016 respectively comprise the same functions as the state storing unit 303, the G-ARP transmission unit 305, the link state detection unit 301 and the transmission standby timer 302 in the above described first embodiment.

Also, the processing of the state storing unit 1013, the link state detection unit 1015, and the transmission standby timer 1016 is the same as in FIG. 6A. However, a trigger by which the processing is started is different. That is, in the present embodiment, when the power saving mode is transitioned into, a network I/F 906 is first disconnected, the link connection to the switch 102 is made again, and then the link state detection unit 1015 detects the link connection (step S601). Subsequent processing is the same as in FIG. 6A, so explanation thereof is omitted.

<Processing Procedure>

Figure 11A:
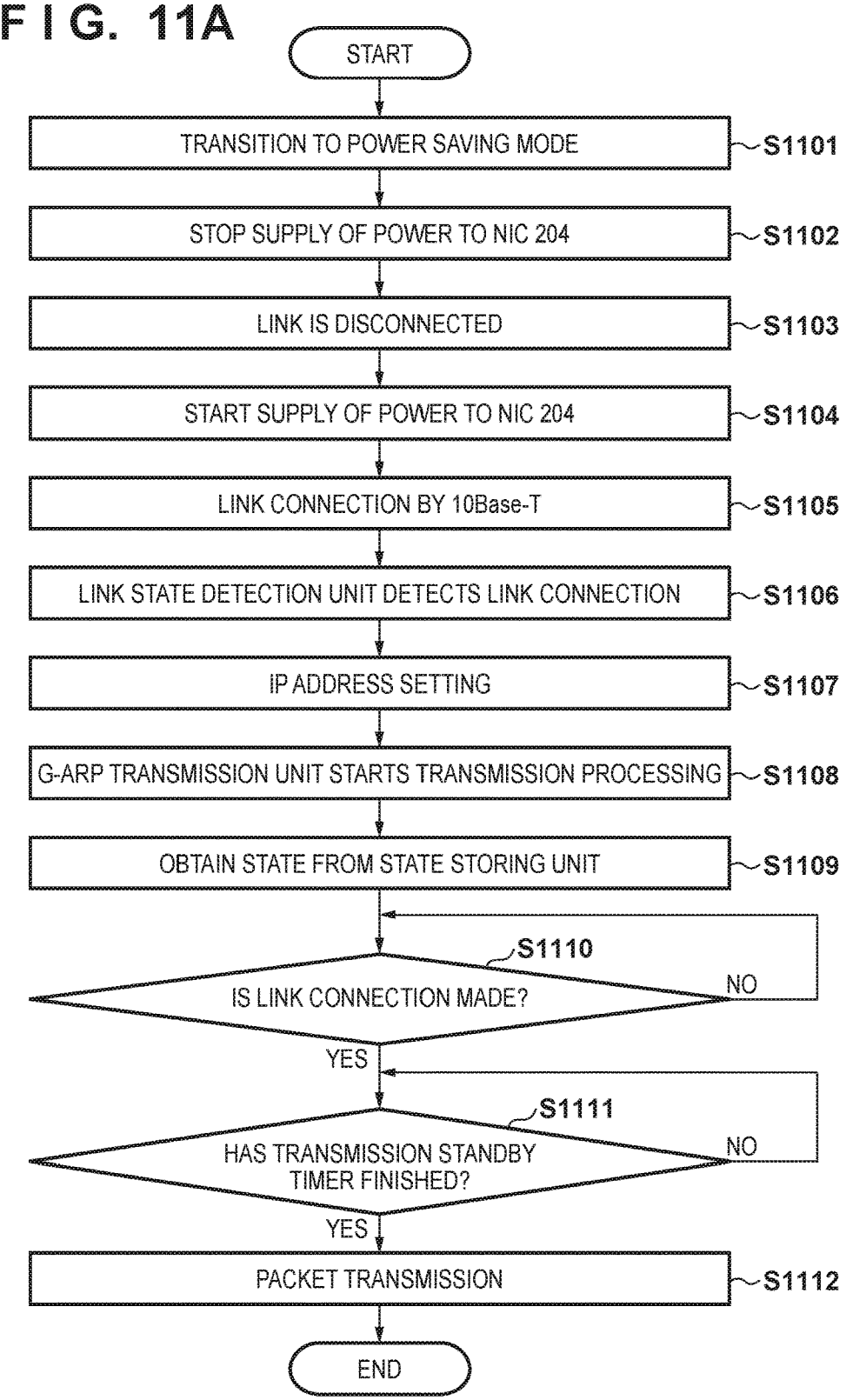
FIG. 11A is a flowchart of the image forming apparatus according to an embodiment.

Next, with reference to FIG. 11, explanation is given for processing of the present embodiment. FIG. 11A illustrates a processing procedure for when the image forming apparatus 103 transitions to the power saving mode. Processing explained below is realized by the CPU 901 reading out a control program stored in advance in the ROM 902 to the RAM 903 and executing it.

In step S1101 the image forming apparatus 103 stops a power supply to the CPU 201, and transitions to the power saving mode. Here, because a setting relating to Ethernet is changed to 10BASE-T, the NIC 204 is restarted. Thus, firstly in step S1102, the image forming apparatus 103 stops the supply of power to the NIC 204, and in step S1103 disconnects the link connection. Thereafter, in step S1104 the image forming apparatus 103 starts the supply of power to the NIC 204 again.

When power is supplied, in step S1105 the CPU 901 of the NIC 204 performs a link connection by the setting of 10BASE-T to reduce power consumption. Thereafter, in step S1106 when the link state detection unit 1015 detects the link connection, for subsequent processing, processing that is the same as processing of step S614 and after performed by the CPU 201 and explained in the above described first embodiment is performed. Thereby a G-ARP packet is transmitted (step S1107—step S1112).

Next, referring to FIG. 11B, explanation is given for a processing procedure of when the image forming apparatus 103 returns from the power saving mode. At this point, it is necessary to restart the NIC 204 to return the Ethernet setting that was changed to 10BASE-T at the time of the power saving mode to that set in the user interface of FIG. 7.

In step S1121 the image forming apparatus 103 provides a power supply to the CPU 201, and returns from the power saving mode. Here, to change the setting relating to Ethernet to the content set by the user interface of FIG. 7, the NIC 204 is restarted. To do this, firstly in step S1122, the image forming apparatus 103 stops the supply of power to the NIC 204, and in step S1123 disconnects the link connection. Once again, in step S1124 the image forming apparatus 103 starts the supply of power to the NIC 204. When power is supplied, in step S1125 the CPU 901 performs a link connection by setting in accordance with the content set in the setting value storing unit 1012. After this, in step S1126, the link state detection unit 1015 detects the link connection. For subsequent processing, by performing processing the same as the processing from step S614 which the CPU 201 performs in the above described first embodiment, the G-ARP packet is transmitted (step S1127—step S1132).

As explained above, after transition is made to the power saving state and when the power saving state is returned from, the image forming apparatus 103 according to the present embodiment can achieve the same effect as in the above described first embodiment.

<Fourth Embodiment>

Next, explanation will be given for a fourth embodiment of the present invention. In the present embodiment, configuration of the network configuration and the image forming apparatus are the same as those of the above described first embodiment, but processing when transmitting the G-ARP packet is different.

<Sequence>

Next, with reference to FIG. 12 explanation will be given for a flow of a sequence of processing from a link connection to a packet transmission. Firstly, in step S1201, the image forming apparatus 103, starts a link connection with the switch 102. When a link is connected, in step S1202 the switch 102 blocks communication with the image forming apparatus 103.

Meanwhile, in step S1203 the image forming apparatus 103 detects that a link has been connected, in step S1204 starts the transmission standby timer to wait for packet transmission for the time stored in the setting value storing unit 304, and in step S1205 performs the packet transmission standby. At this point, the image forming apparatus 103 distinguishes the G-ARP packet from other application communication packets, and even if other applications are standing by for packet transmission in step S1205, in step S1206 transmits the G-ARP packet first by the G-ARP transmission unit 305. Here, three transmissions of a G-ARP packet are performed, but actually any number may be performed. In addition, a timing may be immediately after making a link connection, it may be after several seconds, or transmission may be performed periodically. In other words, here, at a stage in which that a physical connection to the switch 102 has been made is detected, the G-ARP packet is transmitted.

Note that, regarding such an operation, if the image forming apparatus 103 has a function by which it is possible for a user to install an additional application into the image forming apparatus 103, such an operation may occur if the additionally installed application has a specification for transmitting a G-ARP at a time of a link connection. Thus, in step S1208 the G-ARP transmission unit 305, in addition to the transmitted G-ARP, performs transmission of an additional G-ARP at a timing at which transmission standby has terminated in the same way as in the control explained in the above-described first through third embodiments. Thereafter, in step S1209 the application communication unit 306 transmits an SLP packet.

<Processing Procedure>

Next, with reference to FIG. 13, explanation is given for details of the processing procedure according to the present embodiment. Note that what is different from other embodiments is only processing of the G-ARP transmission unit 305, and because the processing of the application communication unit 306 is the same as in the flowchart of FIG. 6B, only G-ARP processing is explained. Processing explained below is realized by the CPU 201 reading out a control program stored in advance in the non-volatile area 203 to the volatile area 202 and executing it.

In step S1301 the G-ARP transmission unit 305 starts processing for transmitting a G-ARP packet, and in step S1302 a G-ARP packet is transmitted at the timing explained in step S1206 described above. Thereafter, similarly to the above-described first embodiment, in step S1303, the G-ARP transmission unit 305 obtains state information from the state storing unit 303, and in step S1304 stands by until a link connection is detected by the link state detection unit 301. When a link connection is made, in step S1305 the G-ARP transmission unit 305 stands by until the transmission standby timer 302 has expired, and when it has expired, in step S1306 the G-ARP transmission unit 305 transmits a G-ARP packet, and processing terminates.

As explained above, when physically connected to a connection destination apparatus, the image forming apparatus 103 according to the present embodiment starts transmission of only a predetermined packet, and transmission of other packets is restricted until a predetermined amount of time has elapsed. In other words, the image forming apparatus according to the present embodiment, in accordance with a type of a packet, can switch whether to transmit the packet from immediately after being physically connected to the connection destination apparatus. Note that configuration may be taken so as to set, by a user input, a packet to transmit from immediately after being physically connected to the connection destination apparatus.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-035629 filed on Feb. 25, 2015, which is hereby incorporated by reference herein in its entirety.

What is claimed is:

1. A printing apparatus that transmits an SLP packet to a network via a hub, the apparatus comprising:
   a memory that stores instructions;
   a processor that executes the instructions to:
      detect a link-up of a link with the hub;
      start a time measurement before a communication state of the link with the hub is established, upon detecting the link-up;
      determine whether a predetermined time has elapsed since the time measurement was started; and
      perform processing to transmit an SLP packet when it is determined that the predetermined time has elapsed since the time measurement was started,
      wherein the SLP packet is not transmitted until it is determined that the predetermined time has elapsed since the time measurement was started.

2. The printing apparatus according to claim 1, wherein a communication rate when the printing apparatus operates in a first power mode is different from a communication rate when the printing apparatus operates in a second power mode of which a power consumption is lower than a power consumption of the first power mode, and
   wherein the detected link-up is a link-up of the link generated when the printing apparatus transits from the first power mode to the second power mode.

3. The printing apparatus according to claim 1, wherein a communication rate when the printing apparatus operates in a first power mode is different from a communication rate if the printing apparatus operates in a second power mode of which a power consumption is lower than a power consumption of the first power mode, and
   wherein the detected link-up is a link-up of the link generated when the printing apparatus transits from the second power mode to the first power mode.

4. The printing apparatus according to claim 1, wherein the processor further performs processing to transmit a G-ARP packet before it is determined that the predetermined time has elapsed since the time measurement was started, and wherein the processor further performs processing to transmit the G-ARP packet again when it is determined that the predetermined time has elapsed since the time measurement was started.

5. The printing apparatus according to claim 1, wherein a communication rate when the printing apparatus operates in a first power mode is different from a communication rate if the printing apparatus operates in a second power mode of which a power consumption is lower than a power consumption of the first power mode, and
wherein the detected link-up is a link-up of the link generated when the printing apparatus transits from the first power mode to the second power mode, and a link-up of the link generated when the printing apparatus transits from the second power mode to the first power mode.

6. The printing apparatus according to claim 1, wherein the hub does not transfer packets transmitted from the printing apparatus to the network for a certain time after establishing the link.

7. The printing apparatus according to claim 1, wherein the hub does not transfer packets transmitted from the printing apparatus to the network until the link speed stabilizes with the printing apparatus.

8. The printing apparatus according to claim 1, wherein the hub does not transfer packets transmitted from the printing apparatus to the network until packets can be stably transferred.

9. The printing apparatus according to claim 1, wherein a timing after a predetermined time elapses from the start of the time measurement is a timing after the link has been established with the hub.

10. A method of controlling a printing apparatus including a transmission unit that transmits an SLP packet to a network via a hub, the method comprising:
detecting a link-up of a link with the hub;
starting a time measurement before a communication state of the link with the hub is established, upon detecting the link-up;
determining whether a predetermined time has elapsed since the time measurement was started; and
performing processing to transmit an SLP packet when it is determined that the predetermined time has elapsed since the time measurement was started,
wherein the SLP packet is not transmitted until it is determined that the predetermined time has elapsed since the time measurement was started.

11. A non-transitory computer-readable storage medium storing a computer program for causing a processor of a computer to execute a method of controlling a printing apparatus including a transmission unit that transmits an SLP packet to a network via a hub, the method comprising:
detecting a link-up of a link with the hub;
start a time measurement before a communication state of the link with the hub is established, upon detecting the link-up;
determining whether a predetermined time has elapsed since the time measurement was started; and
performing processing to transmit an SLP packet when it is determined that the predetermined time has elapsed since the time measurement was started,
wherein the SLP packet is not transmitted until it is determined that the predetermined time has elapsed since the time measurement was started.

* * * * *